April 21, 1970  C. H. DAUDT  3,507,246

AIRCRAFT INSTRUMENT DIAL

Filed July 22, 1966

Charles H. Daudt, INVENTOR.

United States Patent Office 3,507,246
Patented Apr. 21, 1970

3,507,246
AIRCRAFT INSTRUMENT DIAL
Charles H. Daudt, P.O. Box 511,
Ridgefield, Conn. 06877
Filed July 22, 1966, Ser. No. 567,129
Int. Cl. G09f 9/00
U.S. Cl. 116—129               2 Claims

ABSTRACT OF THE DISCLOSURE

A dial for an aircraft instrument showing actual angle of attack and corresponding limiting Mach number on the same dial. These two factors together establish the imminence of a stall or stall buffeting.

---

This invention relates to aircraft instrument dials and particularly to a dial with two scales. The outer scale graduated in degrees, indicates angles of attack (local airflow which is related to true airflow) from the theoretical zero lift to low speed stall buffet at insignificantly low Mach numbers. The inner scale graduated in Mach numbers indicates angles of attack at which stall buffet will occur at various Mach numbers from insignificantly low Mach numbers to the maximum operating Mach number.

My invention provides for calibrating an angle of attack indicator for relatively low speed stall buffet throughout the Mach number operating range and to be used while operating aircraft at high Mach numbers in straight and level flight and while maneuvering with load factors greater than one.

An object is to provide an angle of attack indicator the dial of which shows, with relation to one pointer, the existing angle of attack and the related Mach number at which stall buffet will occur.

Another object is to provide a dial for an angle of attack indicator; the dial showing angle of attack by means of an arcuately disposed outer scale and showing buffet Mach number by means of an arcuately disposed inner scale.

Other objects will be evident in the following description.

Figure 1:
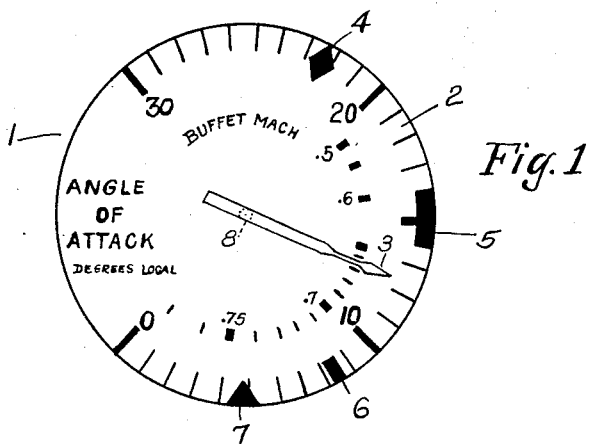
FIGURE 1 is a face view of my novel instrument dial, showing the associated pointer.

The dial 1 has outer angle of attack scale 2 arcuately arranged as shown. This type scale has been widely used in angle of attack indicating instruments. The pointer 3 is attached to the shaft 8 of the instrument and indicates, relative to scale 2, angle of attack. This dial has been made rotatable through a limited angle about its axis, in some cases, so that the reference marks may be adjusted to conform to special conditions which may include design features of the aircraft carrying the instrument. The pointer is made narrow adjacent the Buffet Mach Scale so that this scale can be read accurately.

The mark 4 indicates the low speed buffet index for landing configuration. The mark 5 is the approach index, establishing the reference for the angle of attack pointer during landing approach at the optimum angle of attack.

Marks 6 and 7 may be used for other key angle of attack indexes such as for maximum lift-to-drag ratio when the aircraft is in the enroute or clean configuration, for maximum endurance and for one or two engine inoperative enroute or clean configuration climb-out.

The Mach number scale labeled "Buffet Mach" is arcuately disposed with respect to the axis of the instrument pointer shaft 8, but at lesser radius than the angle of attack scale. It will be noticed that the Mach number values increase as the angle of attack values on scale 2 decrease. This is true of course since the higher the speed, higher Mach number and resulting more separation, the less is the permissible angle of attack in order to avoid buffet. There is both a high speed and a low speed buffet, but the term "low speed" is used relatively, with respect to speeds in the Mach range.

Figure 2:
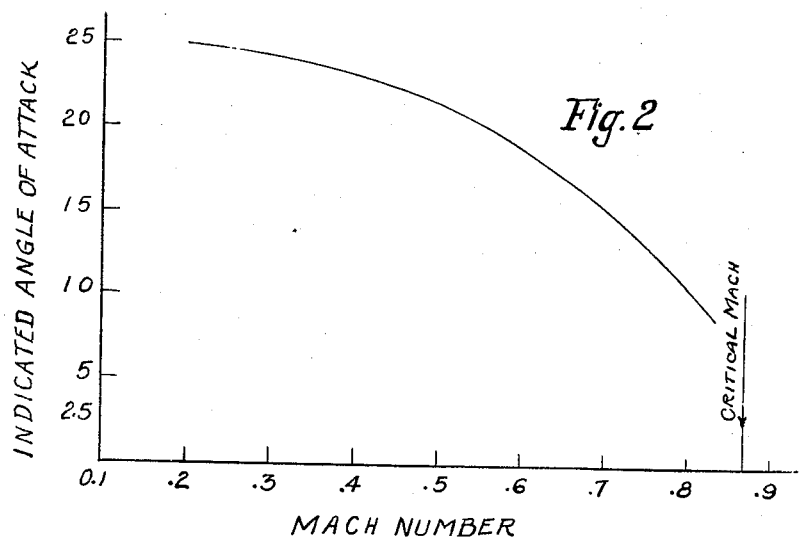
FIGURE 2 is a curve showing indicated angle of attack versus buffet Mach number, typically for a swept wing aircraft.

FIGURE 2 shows a flight test calibration curve for a swept wing type aircraft and is a reasonable representation of the angle of attack-Mach number curve for various aircraft of this general type. The curve defines the limiting Mach speeds which can be attained without buffet, for various angles of attack, as indicated.

Another method by which the pilot may use pointer 3 is for the pilot to refrain from increasing the angle of attack such that the Mach number under the pointer on the inner scale of the angle of attack indicator reads the same as the Machmeter indicated Mach number. Thus, the pilot is constantly aware of his situation with respect to relatively low speed stall buffet at high altitudes and high Mach numbers and he will avoid approaching a critical angle of attack so that the aircraft will not approach or enter a stall wherein control of the aircraft may be lost.

By having two scales which are read with relation to only one pointer, the situation of the aircraft with respect to angle of attack and the limiting Mach number can be read rapidly and reliably. This critical relationship can not be estimated by reference to instruments conventionally provided for the pilot.

What I claim is:

1. In an aircraft instrument to provide warning of impending buffet including a scale displaying angles of attack, an indicator associated with said scale for showing the actual angle of attack of said aircraft, a second scale adjacent said first scale showing maximum value of Mach number relative to angle of attack that the aircraft may fly before buffet occurs, said indicator also being associated with said second scale to indicate Mach numbers on said second scale, whereby the pilot may know the maximum value of Mach number possible for the existing angle of attack of said aircraft prior to buffet.

2. In an aircraft instrument as set forth in claim 1 in which said first and second scales are arcuate and concentric.

References Cited

UNITED STATES PATENTS

| | | | |
|---|---|---|---|
| 2,258,826 | 10/1941 | Torkelson | 73—178 |
| 2,217,564 | 10/1940 | Scriba | 50—495 |
| 2,706,407 | 4/1955 | Hosford | 73—182 |
| 2,794,314 | 6/1957 | Slaugh | 116—133 |
| 3,146,578 | 9/1964 | Etienne | 116—114 XR |
| 3,205,708 | 9/1965 | Andresen | 73—182 |
| 3,206,974 | 9/1965 | Andresen | 73—180 |
| 3,262,416 | 7/1966 | Nichinson | 116—129 |

LOUIS J. CAPOZI, Primary Examiner